US012566890B2

(12) United States Patent
Chakraborty et al.

(10) Patent No.: US 12,566,890 B2
(45) Date of Patent: Mar. 3, 2026

(54) AUTOMATIC COOKIE CONSENT

(71) Applicant: MICRO FOCUS LLC, Wilmington, DE (US)

(72) Inventors: Santanu Chakraborty, Bengaluru (IN); Henchinapalya Nagaraj Madhu Sudhan, Bengaluru (IN); Prasanna Kulkarni, Bengaluru (IN); Kannan Ravichandran, Bengaluru (IN); Nagesh Jatagond, Bengaluru (IN)

(73) Assignee: Micro Focus LLC, Austin, TX (US)

( * ) Notice: Subject to any disclaimer, the term of this patent is extended or adjusted under 35 U.S.C. 154(b) by 96 days.

(21) Appl. No.: 18/540,749

(22) Filed: Dec. 14, 2023

(65) Prior Publication Data

US 2025/0200225 A1     Jun. 19, 2025

(51) Int. Cl.
*G06F 21/00* (2013.01)
*G06F 21/62* (2013.01)

(52) U.S. Cl.
CPC ............................... *G06F 21/6263* (2013.01)

(58) Field of Classification Search
None
See application file for complete search history.

(56) References Cited

U.S. PATENT DOCUMENTS

| | | | | |
|---|---|---|---|---|
| 11,436,373 B2 * | 9/2022 | Brannon | ............... | G06F 16/957 |
| 11,556,672 B2 * | 1/2023 | Brannon | ............... | G06F 21/602 |
| 11,640,479 B1 * | 5/2023 | Sanchez | ............. | G06F 21/6245 |
| | | | | 726/26 |
| 11,663,359 B2 * | 5/2023 | Beaumont | ........... | H04L 63/1433 |
| | | | | 726/25 |
| 11,671,509 B2 * | 6/2023 | Sprague | ............... | H04L 9/3231 |
| | | | | 726/26 |
| 12,072,950 B1 * | 8/2024 | Jain | ........................ | G06N 20/00 |
| 2011/0191664 A1 * | 8/2011 | Sheleheda | ............. | G06F 21/552 |
| | | | | 709/224 |
| 2020/0110904 A1 * | 4/2020 | Shinde | ................ | G06F 21/6272 |
| 2023/0106409 A1 * | 4/2023 | Jones | ................... | G06F 21/604 |
| | | | | 726/26 |
| 2023/0254649 A1 * | 8/2023 | Kuenzle | ............... | H04R 25/505 |
| | | | | 381/318 |

* cited by examiner

*Primary Examiner* — Maung T Lwin
(74) *Attorney, Agent, or Firm* — Sheridan Ross P.C.

(57) ABSTRACT

In response to a web page of a web site having been loaded, a consent management platform (CMP) used by the web site is identified. That the web page includes a cookie consent portion is detected based on the CMP used by the web site. In response to detecting that the web page includes the cookie consent portion, whether the cookie consent portion includes a reject-all option is detected based on the CMP used by the web site. In response to detecting that the cookie consent portion includes the reject-all option, the reject-all option is automatically selected without user interaction.

20 Claims, 14 Drawing Sheets

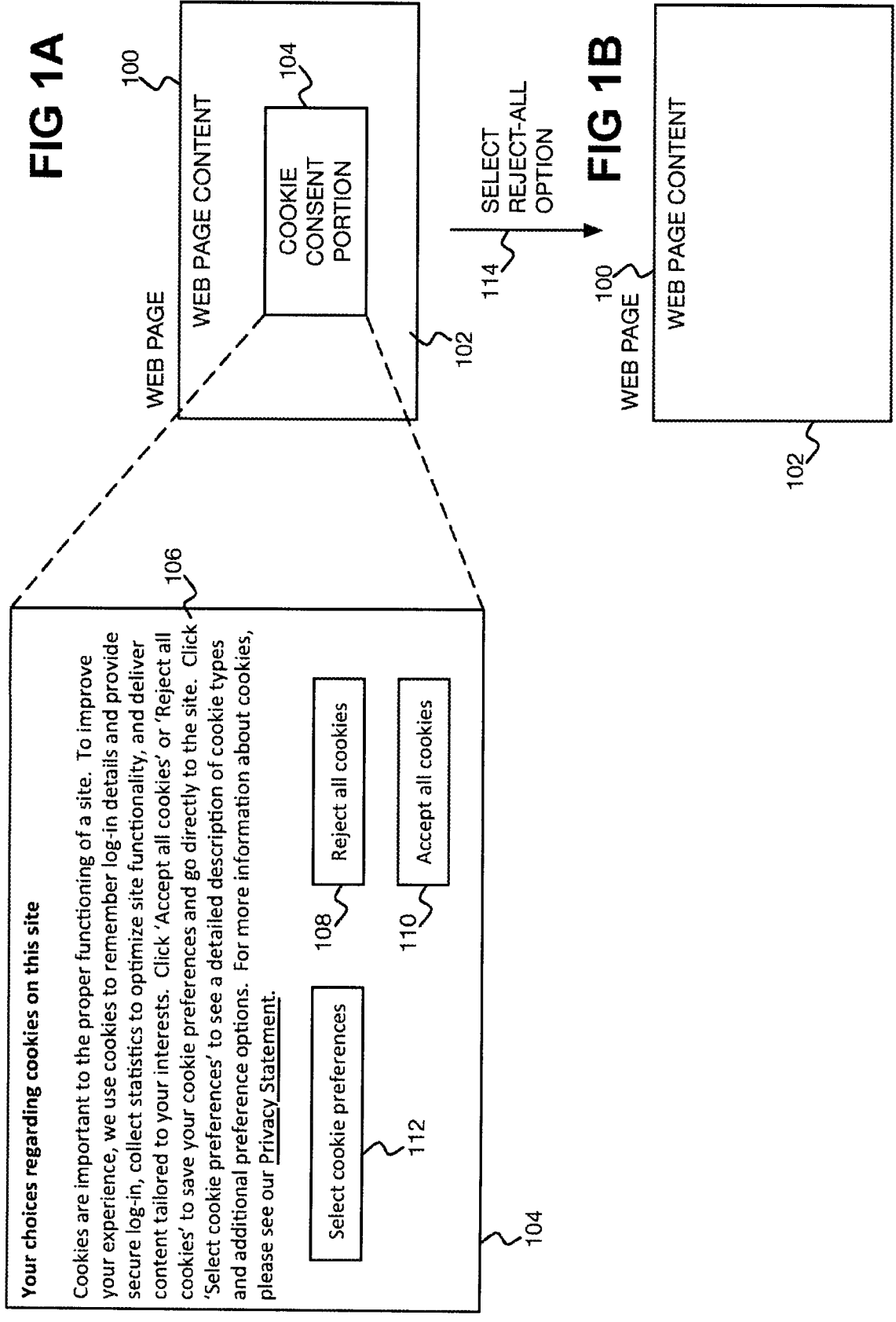

WEB PAGE

WEB PAGE CONTENT

COOKIE CONSENT PORTION

SELECT REJECT-ALL OPTION

WEB PAGE

WEB PAGE CONTENT

Your choices regarding cookies on this site

Cookies are important to the proper functioning of a site. To improve your experience, we use cookies to remember log-in details and provide secure log-in, collect statistics to optimize site functionality, and deliver content tailored to your interests. Click 'Accept all cookies' or 'Reject all cookies' to save your cookie preferences and go directly to the site. Click 'Select cookie preferences' to see a detailed description of cookie types and additional preference options. For more information about cookies, please see our Privacy Statement.

Reject all cookies

Accept all cookies

Select cookie preferences

100

104

102

114

100

102

106

108

110

112

104

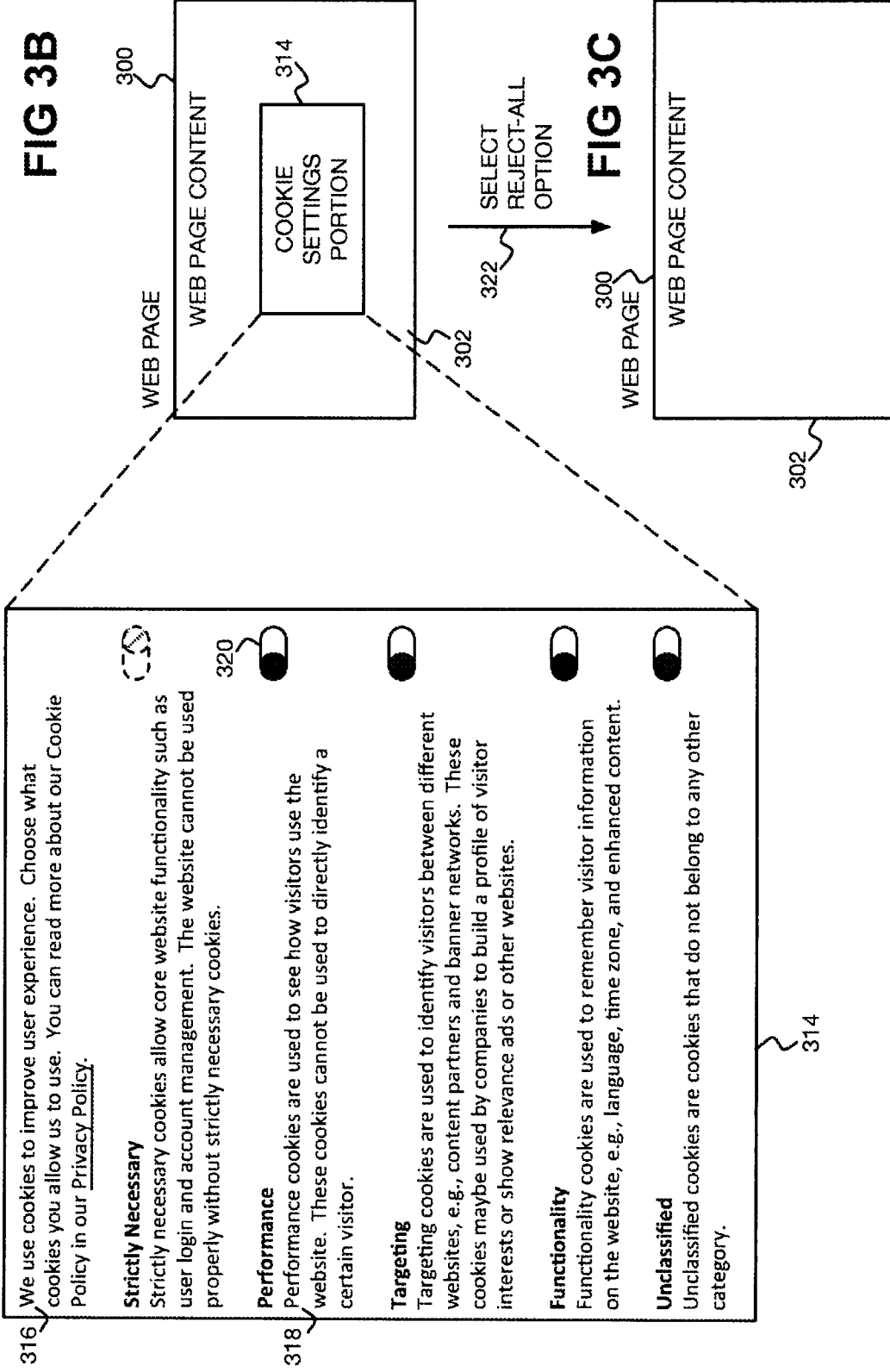

WEB PAGE

WEB PAGE CONTENT

COOKIE SETTINGS PORTION — 314

302

322 — SELECT REJECT-ALL OPTION

WEB PAGE

WEB PAGE CONTENT

302

316 — We use cookies to improve user experience. Choose what cookies you allow us to use. You can read more about our Cookie Policy in our Privacy Policy.

Strictly Necessary
Strictly necessary cookies allow core website functionality such as user login and account management. The website cannot be used properly without strictly necessary cookies.

320

Performance
318 — Performance cookies are used to see how visitors use the website. These cookies cannot be used to directly identify a certain visitor.

Targeting
Targeting cookies are used to identify visitors between different websites, e.g., content partners and banner networks. These cookies maybe used by companies to build a profile of visitor interests or show relevance ads or other websites.

Functionality
Functionality cookies are used to remember visitor information on the website, e.g., language, time zone, and enhanced content.

Unclassified
Unclassified cookies are cookies that do not belong to any other category.

314

400

DETECT SETTINGS OPTION WITHIN COOKIE CONSENT PORTION      402

AUTOMATICALLY SELECT SETTINGS OPTION      404

COOKIE SETTINGS PORTION LOADED      406

DETECT REJECT-ALL OPTION WITHIN COOKIE SETTINGS PORTION      408

AUTOMATICALLY SELECT REJECT-ALL OPTION      410

DONE      412

610

WEB PAGE                                                    600

WEB PAGE INSTRUCTIONS

WEB PAGE CONTENT

612    SECTION

COOKIE
CONSENT
PORTION    604

602

SELECT
SETTINGS
OPTION

616

610

WEB PAGE                                                    600

WEB PAGE INSTRUCTIONS

WEB PAGE CONTENT

614    SECTION

COOKIE
SETTINGS
PORTION    606

602

750

PARSE INSTRUCTIONS OF WEB PAGE BASED ON CMP TO DETECT SETTINGS OPTION WITHIN COOKIE CONSENT PORTION ⟩752

AUTOMATICALLY SELECT SETTINGS OPTION ⟩754

COOKIE SETTINGS PORTION LOADED ⟩756

PARSE INSTRUCTIONS OF COOKIE SETTINGS PORTION TO DETECT REJECT-ALL OPTION WITHIN COOKIE SETTINGS PORTION ⟩758

AUTOMATICALLY SELECT REJECT-ALL OPTION ⟩760

DONE ⟩762

CMP DATABASE                                                                800

CMP IDENTIFICATION PATTERN                                        804

COOKIE CONSENT PORTION IDENTIFICATION PATTERN          806

REJECT-ALL OPTION WITHIN COOKIE CONSENT PORTION IDENTIFICATION PATTERN          808

SETTINGS OPTION WITHIN COOKIE CONSENT PORTION IDENTIFICATION PATTERN          810

REJECT-ALL OPTION WITHIN COOKIE SETTINGS PORTION IDENTIFICATION PATTERN          812

802

950

DETECT SETTINGS OPTION WITHIN COOKIE CONSENT PORTION          952

AUTOMATICALLY SELECT SETTINGS OPTION          954

COOKIE SETTINGS PORTION LOADED          956

DETECT OPTION CORRESPONDING TO USER-SPECIFIED SETTING WITHIN COOKIE SETTINGS PORTION          958

AUTOMATICALLY SELECT CORRESPONDING OPTION          960

DONE          962

AUTOMATIC COOKIE CONSENT

BACKGROUND

The Internet, among other networks, permits users to access a wealth of information. For instance, a user may have a web browser or other application program installed on his or her computing device. The user may cause the web browser to access a web site at a uniform resource locator (URL) or other network address of the web site. In turn, the web browser retrieves and displays a web page at the web site. The user can select hyperlinks on the web page to access other web pages on the same or different site.

BRIEF DESCRIPTION OF THE DRAWINGS

FIG. 1A is a diagram of an example web page including an example cookie consent portion having a reject-all option, and FIG. 1B is a diagram of the example web page after the reject-all option has been automatically selected.

FIG. 3B is a diagram of the example web page after a settings option of the cookie consent portion has been automatically selected so that a cookie settings portion is displayed. FIG. 3C is a diagram of the example web page after a reject-all option of the cookie settings portion has been automatically selected.

DETAILED DESCRIPTION

Figure 2:
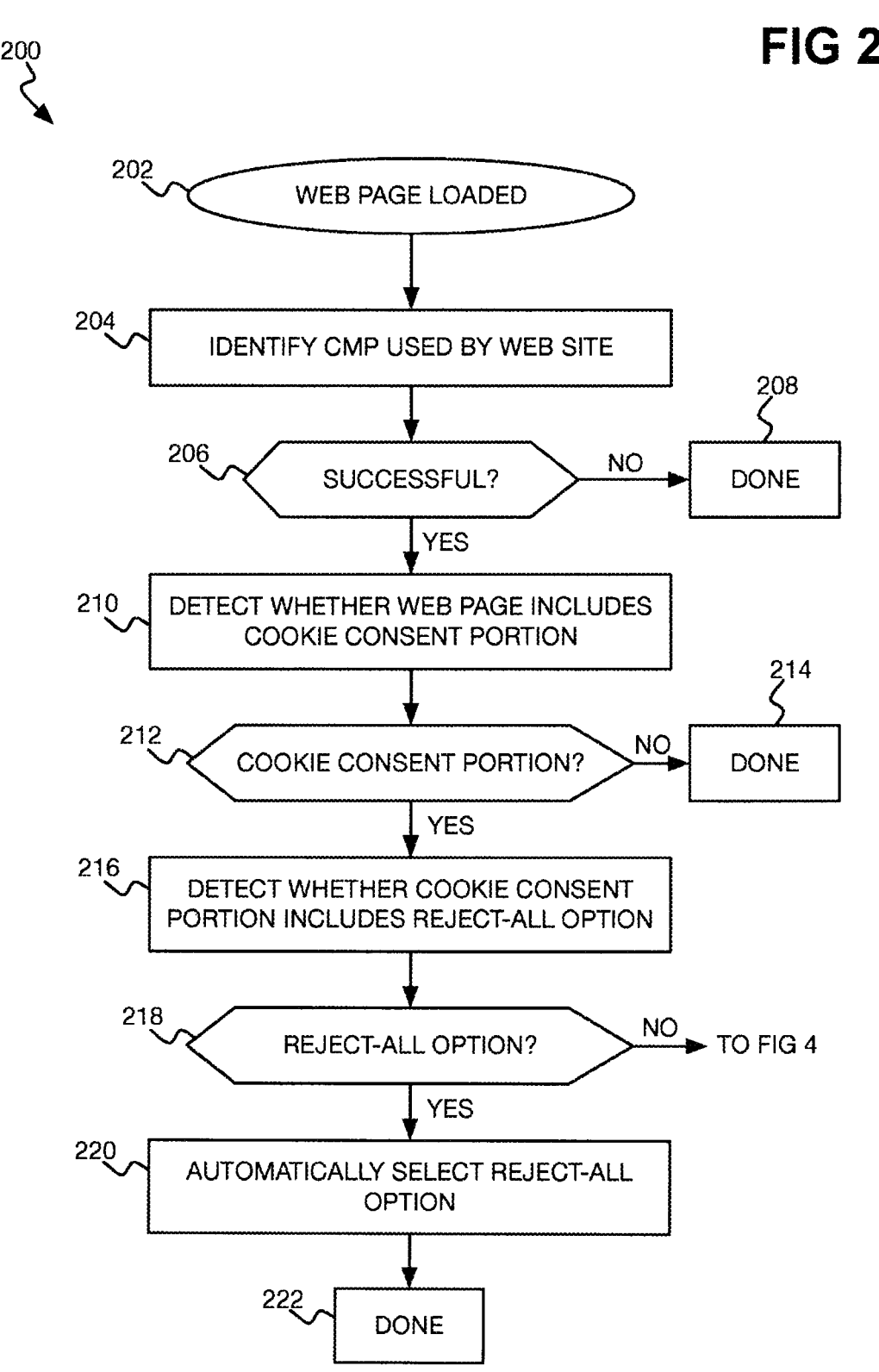
FIG. 2 is a flowchart of an example method for automatically selecting a reject-all option when a cookie consent portion of a web page includes this option, such as the web page of FIGS. 1A and 1B.

As noted in the background, users may use web browsers or other application programs on their computing devices to access web pages of web sites. When the user uses a computing device to access a web site, the site may store one or more cookies on the device. Cookies, which may also be referred to as and/or include web cookies, web page cookies, hypertext transport protocol (HTTP) cookies, and browser cookies, are small blocks of data, such as in the form of files, that a web site can use to for a variety of different purposes.

Cookies can be divided in a number of different ways. Cookies may be divided between first-party cookies and third-party cookies. First-party cookies permit the web site to collect data for analytical purposes, remember user settings, and provide other functions to improve the browsing experience for a user. First-party cookies cannot be used to track user activities on other web sites. By comparison, third-party cookies are used to track users between the web sites, such as to display more relevant advertisements on each web site.

Cookies can also be divided between session cookies and persistent cookies. Session cookies are stored for a given browsing session of a web site. Once a user closes the tab or window of the web browser or other computer program being used to access the web site, the session cookies are deleted such that information stored in the cookies is not retained. By comparison, persistent cookies persist across browsing sessions of a web site unless deleted from the web browser or other computer program being used to access the web site.

Cookies can further be divided by type or category, including strictly necessary, performance, functional, and tracking cookies. Strictly necessary cookies are essential for the operation of a web site, so that a user has the ability to sign in, add items to a cart in an online store, and so on. Strictly necessary cookies are first-party cookies.

Performance cookies monitor web site performance but collect data anonymously in a way in which a user is not individually identifiable. For instance, performance cookies can count page visits, examine how much time a user spends on a web site, analyze loading speeds, and so on. Performance cookies are typically first-party cookies, but may be third-party cookies.

Functional cookies are used for the operation of a web site but are not strictly necessary for the web site to operate. For instance, functional cookies may store user preferences and settings, so that personalized user information can be displayed on the web site, so that a user does not have log back in every time he or she visits the web site, and so on. Functional cookies can be first-party or third-party cookies, can be persistent or session cookies, and are anonymous cookies in that they do not track users across different web sites.

Tracking cookies, which may also be referred to as targeting cookies, track individual users across web sites, and are therefore usually third-party cookies. Tracking cookies can be used to help build user profiles. This can permit, for instance, advertisements displayed on the web sites visited by a user to be more relevant to the user.

The usage of cookies has privacy concerns. Cookies stored on a computing device may reveal information regarding the user of that device. More significantly, tracking cookies provide for at least the possibility of building a profile of the user, particularly when tracking occurs across web sites visited by the user using third-party tracking cookies.

Therefore, various governmental jurisdictions have established policies, rules, regulations, and laws governing the usage of cookies. For instance, the first time a user visits a web site, the site may be required to obtain the user's consent to use cookies other than strictly necessary cookies. For example, a cookie consent popup may be displayed on the current web page of a web site. The popup may require the user to consent to the usage of cookies before he or she can continue accessing the site, or may persist while the user continues to access the site until the user provides consent or closes the popup.

The cookie consent popup may have consent setting options that differ by the governmental jurisdiction in which the user is located. For example, the European Union's General Data Protection Regulations (GDPR) require that a web site provide in the initial cookie consent popup an option to use only strictly necessary cookies. By comparison, other jurisdictions may not require that this option be included in the initial cookie consent popup. In these jurisdictions, users may first have to select an option in the initial cookie consent popup to display more detailed cookie settings before they can consent to the usage of only strictly necessary cookies. Regardless of jurisdiction, the vast majority of web sites include an option to accept all cookies (i.e., consent to the usage of all cookies).

The requirement that user consent be provided before cookies other than strictly necessary cookies can be used has, however, become burdensome to users. As a user accesses different web sites using a web browser computer program on his or her computing device, for instance, the user may frequently encounter cookie consent popups. At a minimum, such popups can be an annoyance, forcing the user to implicitly or explicitly select a cookie consent option so that the popups are no longer displayed.

More indelibly, users may become inured to the cookie consent popups in such a way that they implicitly or explicitly select the option to accept all cookies to the potential detriment of their privacy (knowingly or unknowingly) as the most expedient way to remove the popups. For example, a web site may present the option to use only strictly necessary cookies as a reject all cookies option, which may be technically accurate insofar as consent is not required for strictly necessary cookies (such that the option does not pertain to these cookies), but which may nevertheless be misleading. The user may therefore instead select the accept all cookies option because he or she does not understand that rejecting all cookies still permits strictly necessary cookies to be used, and thus permits the web site to operate.

As another example, a web site may display a cookie consent popup that simply indicates that the site uses cookies. A user may not know that selecting the OK or accept option is tantamount to accepting all cookies, or that selecting the cancel or decline option—or dismissing or closing the popup if that is an option—is tantamount to accepting only strictly necessary cookies. Here, too, the user may select the OK or accept option because he or she believes that otherwise the web site will not function.

Ultimately, then, while requiring user consent for cookies that are not strictly necessary protects user privacy, users may have to understand the options presented in the initial cookie consent popups to make an informed selection as to which cookies to consent to. Even when the users understand the options, they still have to identify and then manually select the options that correspond to their desired degree of consent, which can be a multistep process particularly in jurisdictions that do not require web sites to provide an option to use only strictly necessary cookies. Moreover, particularly for users who were not concerned and/or did know about the privacy ramifications of cookies, the net effect of requiring user consent has been to impede the browsing experience by constantly barraging such users with cookie consent popups.

Techniques described herein ameliorate these and other issues. At a basic level, the techniques provide for detecting that a loaded web page includes a cookie consent portion such as a popup and accordingly automatically selecting a reject-all option (e.g., a reject all cookies option) without user interaction. That is, a user does not have to select the reject all cookies option him or herself. That the cookie consent portion was displayed at all may not even be discernible to the user. In many cases, the user may at most discern a brief flash corresponding to the cookie consent portion being displayed and then quickly removed from display as a result of automatic selection of the reject-all option.

The techniques may also permit the user to specify cookie consent settings other than selecting the option to reject cookies that are not strictly necessary (e.g., the reject all cookies option). For example, the user may on a per-web site basis or on a default basis that is not web site specific indicate a particular type or types of cookies for which consent is to be automatically given. When a web page is loaded that includes a cookie consent portion, an option corresponding to the user-specified cookie consent settings may then be automatically selected without user interaction.

The techniques described herein, therefore, improve computing technology insofar as they improve the usage of computing devices to access information available at web sites on the Internet and other networks. Usage of computing devices to access such information is improved because the information displayed on web pages can be more quickly accessed. A user-specified level of consent to cookie usage is automatically provided so that a user can immediately access and/or continue to use the web site as desired without first having to manually provide such consent.

The techniques described herein furthermore are not practicably performed without utilization of a computing device. That is, the concepts of web pages, cookies, and so on, did not exist before the advent of computers, and are effectively meaningless outside the context of computing devices. Moreover, the techniques are specific to a particular technological environment insofar as they pertain to web pages that employ cookies and that have to receive user consent to the usage of cookies other than strictly necessary cookies.

To detect that a web page includes a cookie consent portion, as well as to identify the various selectable consent options therein, the techniques described herein leverage the usage of consent management platforms (CMPs) by many if not most web sites. A CMP is a software platform that a web site can employ to manage the process of collecting and storing cookie consent preferences of users, to ensure that the web site is compliant with the differing cookie consent requirements of the jurisdictions of the users accessing the web site. Examples of CMPs include that provided by OneTrust of Atlanta, Georgia; the CookieBot CMP provided by Usercentrics GmbH of Munich, Germany; and that provided by Osano, Inc., of Austin, Texas.

Web sites that use a particular CMP to manage cookie consent incorporate instructions, such as code in the form of JavaScript, a markup language including the hypertext markup language (HTML), and so on, on their web pages in a way that identifies the CMP. Therefore, which CMP a web site uses can be identified by inspecting the instructions (e.g., the code in the form of a markup language such as HTML) of the web pages of the site. Different CMPs may moreover have different particular ways by which cookie consent portions are coded within their web pages. This means that once the CMP that a web site uses is identified from a web page of the site, whether the loaded web page includes (i.e., has displayed) a cookie consent portion can be identified.

Similarly, a given CMP may specify selectable cookie consent options (which may differ by jurisdiction) within a cookie consent portion is a particular way. Therefore, once the CMP that a web site uses is identified from a loaded web page of that site, and if the web page includes a cookie consent portion, then the cookie consent options presented within the portion can be identified so that the appropriate option can be selected. The inventors have recognized, in other words, that to viably detect whether a given web page includes a cookie consent portion and to viably detect the cookie consent options in that portion does not require knowledge of how each different web site encodes such information in the instructions (e.g., the HTML or JavaScript) of its pages.

Rather, the CMPs used by the web sites that account for a large amount if not the majority of web traffic across the Internet are relatively small in number, and the number of web sites used by each of the most popular CMPs may be in the hundreds of thousands if not more. Because the web sites using a given CMP encode cookie consent portions and cookie consent options in the same way in their web pages, knowledge of such information is just needed on a per-CMP basis and not on a per-web site basis. As such, providing for automatic selection of a reject-all option (or, more generally, an option corresponding to (user-specified cookie consent settings) is tractable.

FIGS. 1A and 1B show an example web page 100 of a web site, which has been loaded by a web browser or other application computer program running on a computing device. The web page 100 includes web page content 102, which can include the content associated with the web site that is a reason why a user would access the site to load and display the web page 100. The web site employs cookies, including cookies other than those that are strictly necessary for the operation of the site (e.g., including the page 100), and therefore has to receive user consent before such cookies can be used.

If the web site has not been accessed using the particular web browser or other computer program running on the computing device in question, then the web page 100 includes a cookie consent portion 104 over or adjacent to the web page content 102, per FIG. 1A. In the example, the cookie consent portion 104 is in the form of a popup superimposed over and obscuring a center portion of the web page content 102 of the web page 100. However, in other examples, the cookie consent portion 104 may not be a popup, and may not be superimposed and/or centered over the content 102.

The cookie consent portion 104 in the example includes cookie information 106 that provides the user information regarding cookies. The cookie consent portion 104 in the example further specifically includes a reject all cookies control 108, as well as an accept all cookies control 110 and a select cookie preferences control 112. The reject all cookies control 108 is a reject-all option that if selected permits the web site (including the web page 100) to use only cookies that are strictly necessary for its operation. The reject-all option is a misnomer to the extent that its selection still allows for cookies that are strictly necessary. The reject all option may thus be more explicitly indicated as a use or accept only necessary cookies control (e.g., a necessary cookies-only option), instead of as the reject all cookies control 108 as in the example.

The accept all cookies control 110 is an accept-all option that if selected permits the web site to use all cookies, and not just those that are strictly necessary. Selecting either the reject-all option or the accept-all option results in removal of the cookie consent portion 104 such that the portion 104 is no longer displayed. The user can therefore continue to access the web site in accordance with the selected cookie consent option. By comparison, the select cookies preferences control 112 is a settings option that if selected may display a cookie settings portion (e.g., a window or popup) by which the user can select which cookies the web site can use on a more granular level than accepting all cookies or only strictly necessary cookies. In the example, however, the reject-all option (i.e., the reject all cookies control 108) has been selected, per arrow 114, such that the cookie consent portion 104 is no longer displayed, per FIG. 1B.

The reject-all and select-all options may be displayed in a different manner than that shown in the example. For instance, the cookie information 106 of the cookie consent portion 104 may indicate that the web site uses cookies, and include an OK or accept control and a cancel or decline control. In this case, selection of the OK or accept control results in consent of usage of all cookies, such that the control corresponds to the select-all option. By comparison, selection of the cancel or decline control results in consent to only strictly necessary cookies, such that the control corresponds to the reject-all option. Furthermore, if the cookie consent portion 104 includes a close control (e.g., an X in a circle or a rectangle) that when selected results in the portion 104 being closed or dismissed, selection of the close control may also result in consent to only strictly necessary cookies, such that the control also corresponds to the reject-all option.

FIG. 2 shows an example method 200 for automatically selecting the reject-all option when this option is displayed in the cookie consent portion of a loaded web page of a web site. The method 200 may be performed by a processor of a computing device executing program code. For instance, the method 200 may be performed by a web browser or other application computer program running on a computing device. As a particular example, the method 200 may be implemented as a web browser plugin or extension installed in such a web browser.

A web page of a web site is loaded by the web browser or other application computer program (202). Loading of the web page may include displaying the web page on an external or internal display of the computing device on which the browser or other application is running. For example, the instructions of the web page may be retrieved over a network (e.g., the Internet) from a server computing device hosting the web site, which may be referred to as a web server. The instructions may be in the form of JavaScript, a markup language such as HTML, and so on. The instructions are processed to visually render the web page for display.

The method 200 includes, in response (e.g., upon) the web page being loaded, identifying the CMP used by the web site (204). The CMP is identified from the web page of the web site that has been loaded. If the CMP used by the web site has not been successfully identified (206), then the method 200 is finished (208). To the extent that loading of the web page includes displaying the page, and if the web page includes a cookie consent portion, the user of the computing device has to manually select the desired cookie consent option in this case.

However, upon successfully identifying the CMP used by the web site (206), the method 200 includes further detecting whether the web page includes a cookie consent portion (210). Whether the web page includes a cookie consent portion is determined based on the CMP used by the web site. That is, the knowledge of which CMP the web site uses is leveraged to detect whether the web page includes a cookie consent portion. How the particular web site in question includes a cookie consent portion its web pages does not have be a priori known, in other words. Rather, just more generally how web sites that use the particular CMP include cookie consent portions in their page has to be known.

Upon failing to detect that the web page includes a cookie consent portion (212), the method 200 is finished (214). Failure to detect that the web page includes a cookie consent portion may occur in two scenarios. First, the web page may not actually include a cookie consent portion. For example, the user may have previously visited the web site and consented to the usage of cookies, such that the web page does not include the cookie consent portion. Second, the web page may actually include a cookie consent portion, but the method 200 may not have detected it. In this case, the user has to manually select the desired cookie consent option.

In response to successfully detecting that the web page includes a cookie consent portion (212), however, in the example the method 200 includes further detecting whether the cookie consent portion includes a reject-all option, based on the CMP used by the web site (216). Upon failing to detect that the cookie consent portion of the web page includes a reject-all option (218), the method 200 proceeds to FIG. 4 as described below. For instance, the user may be located in a jurisdiction that does not require that the web site initially present a reject-all option, such that the loaded web page includes a cookie consent portion that does not include a reject-all option.

In response to successfully detecting that the cookie consent portion includes a reject-all option (218), however, in the example the method 200 includes then automatically selecting the reject-all option without user interaction (220). For example, the reject-all option may be in the form of a reject all cookies control that is associated with a markup language command or other code or instruction that when executed transmits an indication to the web server hosting the web site that the user has selected the reject-all option. Therefore, automatically selecting the reject-all option in this case means executing the command, code, or instruction in question to notify the web server that this option has been selected. The method 200 is then finished (222).

Figure 3A:
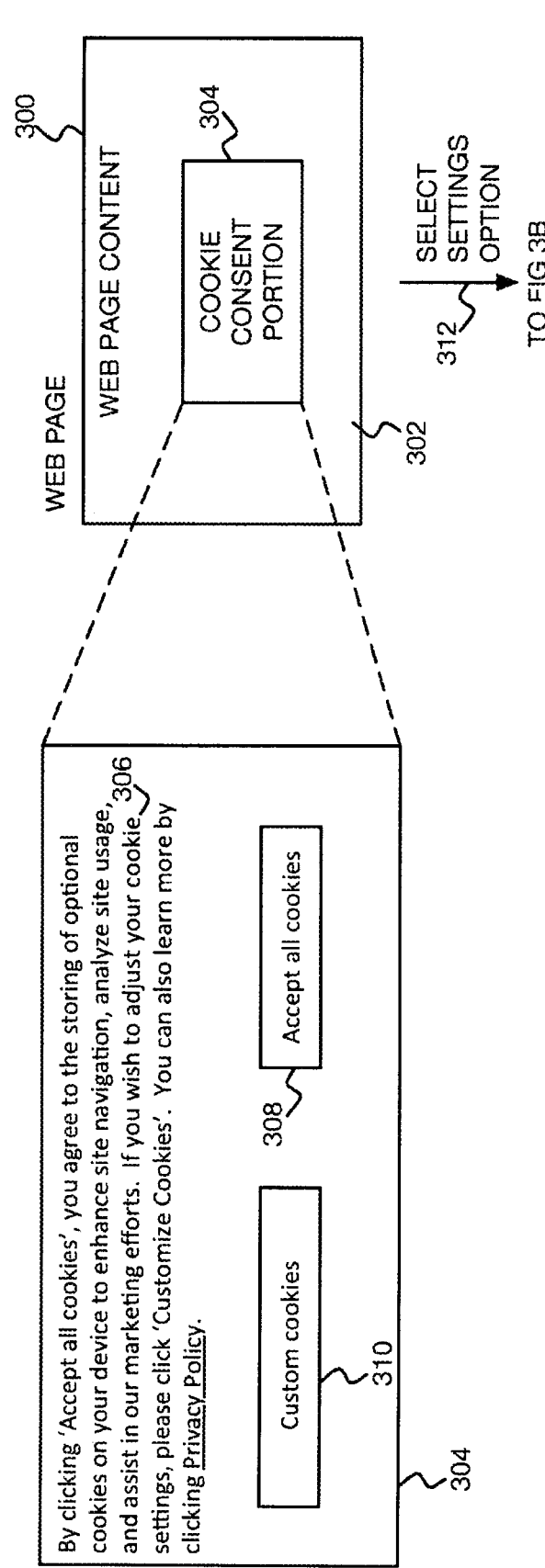
FIG. 3A is a diagram of an example web page including an example cookie consent portion that does not have a reject-all option.

FIGS. 3A, 3B, and 3C show another example web page 300 of a web site, which has been loaded by a web browser or other application computer program running on a computing device. The web page 300 includes web page content 302. The web site employs cookies, including cookies other than those that are strictly necessary for the operation of the site (e.g., including the page 300), and therefore has to receive user consent before such cookies can be used.

If the web site has not been accessed using the particular web browser or other computer program running on the computing device in question, then the web page 300 includes a cookie consent portion 304 over or adjacent to the web page content 302, per FIG. 3A. The cookie consent portion 304 in the example includes cookie information 306 that provides the user information regarding cookies. The cookie consent portion 304 further includes an accept all cookies control 308 corresponding to an accept-all option and a customize cookies control 310 that corresponds to a settings option.

However, the cookie consent portion 304 does not include a reject-all option, such as a reject all cookies control or a use only strict necessary cookies control. Therefore, to select the reject-all option can first require the selection of the settings option. In the example, then, the customize cookies control 310 is selected, per arrow 312, which may result in the cookie consent portion 304 no longer being displayed and which results in a cookie settings portion 314 being displayed over the web page content 302 of the web page 300, per FIG. 3B. In the example, the cookie settings portion 314 is in the form of a popup superimposed and obscuring a center portion of the web page content 302.

The cookie settings portion 314 can include information 316 that provides the user information regarding cookies. The cookie settings portion 314 in the example further includes information regarding different cookie types 318, along with corresponding toggle controls 320. The cookie types 318 in the example include strictly necessary cookies, performance cookies, targeting cookies, functionality cookies, and unclassified cookies (i.e., cookies of types other than those being strictly necessary, performance, targeting, or functionality cookies).

For each cookie type 318 other than strictly necessary cookies, selecting the corresponding toggle control 320 toggles between the right position corresponding to providing consent and the left position corresponding to not providing consent to cookies of that type 318. In the example, the toggle control 320 for strictly necessary cookies is grayed out in the right position. This is because the user is not able to decline consent to strictly necessary cookies, since such cookies are necessary for the web site to operate.

Therefore, in the example, the reject-all option (i.e., the necessary cookies-only option) is selected by toggling (as needed) the controls 320 for the cookie types 318 other than strictly necessary cookies so that the controls 320 are in the left position corresponding to consent not being provided. In the example, then, the reject-all option is selected in this way, per arrow 322, such that the cookie settings portion 314 is no longer displayed (nor the cookie consent portion 304), per FIG. 3C.

The reject-all option may be displayed in a different manner than that shown in the example. For instance, there may be a reject-all control explicitly included in the cookie settings portion 314. Additionally, or instead, the cookie types 318 for which toggle controls 320 are provided may be different than those depicted. The selectable options may additionally or instead be at a different level of granularity, such as first-party cookies versus third-party cookies, for instance. The cookie settings portion 314 may include tabs and other graphical user interface (GUI) elements as well.

Figure 4:
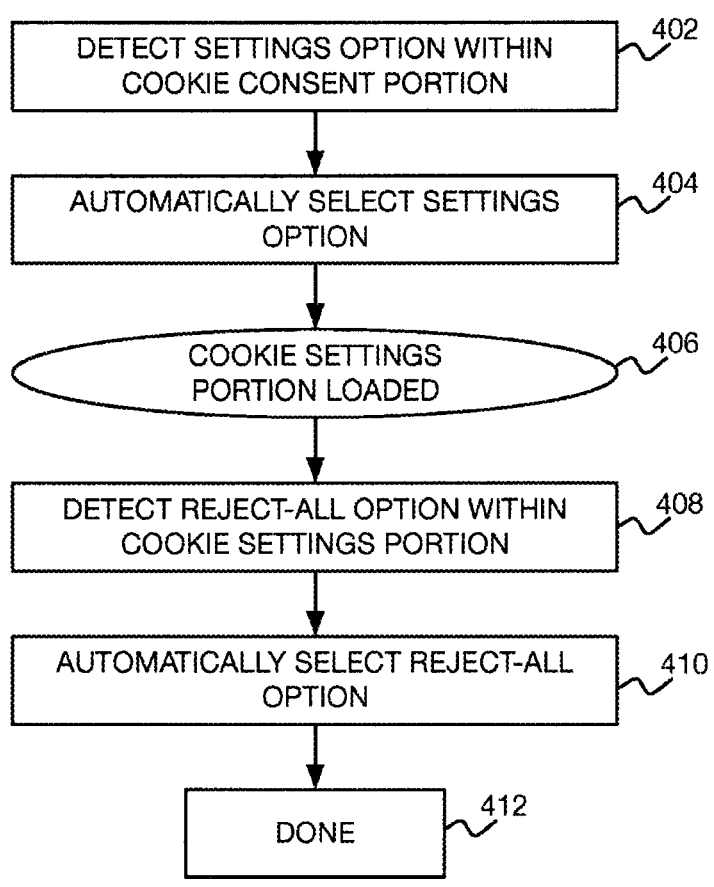
FIG. 4 is a flowchart of an example method for automatically selecting a reject-all option when a cookie consent portion of a web page does not include this option, such as the web page of FIGS. 3A, 3B, and 3C.

FIG. 4 shows an example method 400 for automatically selecting the reject-all option when this option is not displayed in the cookie consent portion of a loaded web page of a web site. As with the method 200 of FIG. 2, the method 400 may be performed by a processor of a computing device executing program code. The method 400 may be performed by a web browser or other application program running on a computing device, and may be implemented as a web browser plugin or extension installed in such a browser. The method 400 is performed when the method 200 cannot detect a reject-all option in the cookie consent portion of the loaded web page.

The method 400 thus includes, in response to unsuccessfully detecting that the cookie consent portion of the web page includes a reject-all option, detecting a settings option within the cookie consent portion based on the CMP used by the web site (402), and then automatically selecting the settings option without user interaction (404). For example, the settings option may be in the form of a customize cookies control that is associated with a markup language command or other code or instruction that when executed transmits an indication to the web server hosting the web site that the user has selected the settings option. Therefore, automatically selecting the settings option means executing the command, code, or instruction in question to notify the web server that this option has been selected.

Automatic selection of the settings option within the cookie consent portion results in loading of a cookie settings portion of the web page (406). The method 400 includes, in response to the cookie settings portion having been loaded, detecting the reject-all option within the cookie settings portion based on the CMP used by the web site (408), followed by automatically selecting this reject-all option without user interaction (410). The method 400 is then finished (412).

Figure 5:
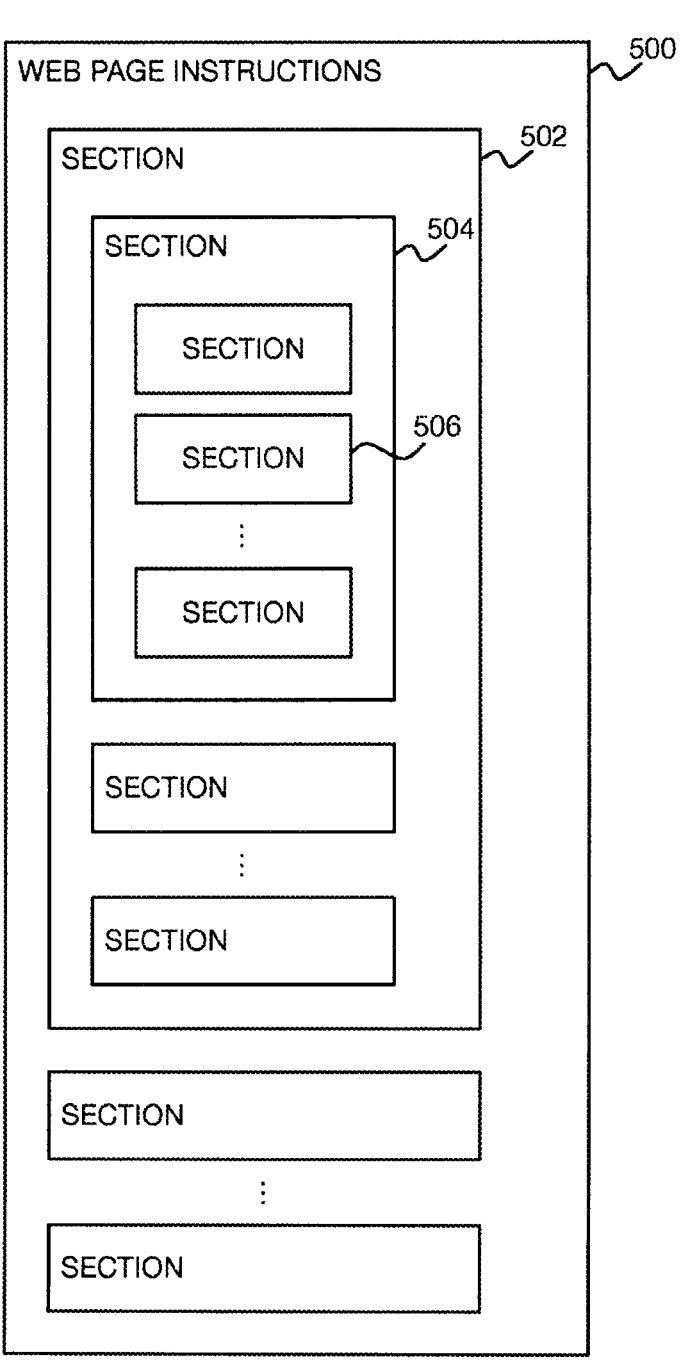
FIG. 5 is a diagram of example instructions for a web page, such as in the form of markup language such as hypertext markup language (HTML), in the form of code such as JavaScript, and so on. The instructions are hierarchically organized in sections.

FIG. 5 shows example instructions 500 for a web page of a web site. The web page instructions 500 include hierarchically organized sections 502, 504, and 506. For example, one or more of the first-level sections 502 may each include second-level sections 504, and one or more of the second-level sections 504 may each include third-level sections 506 (that one or more of which may include fourth-level sections, and so on). The instructions 500 may be in the form of lines of code (not shown for illustrative clarity and convenience), such as lines of JavaScript, or HTML or another markup language.

The web page instructions 500 are for a web page in that it is the instructions 500 that are retrieved from the web server hosting the web site in order to load the web page. The web page instructions 500 are interpreted or otherwise processed, such as by a browser engine that is part of or that is used by the web browser or other application program, to render the web page for display to complete loading of the page. That is, as used herein, a web page is the rendered and displayable (if not displayed) version of the instructions 500 for that web page. Stated another way, what results when processing web page instructions 500 is a rendered and displayable web page corresponding to the instructions 500. The instructions 500 may be considered to at least some degree as the source code for the web page, for instance.

Figures 6A, 6B:
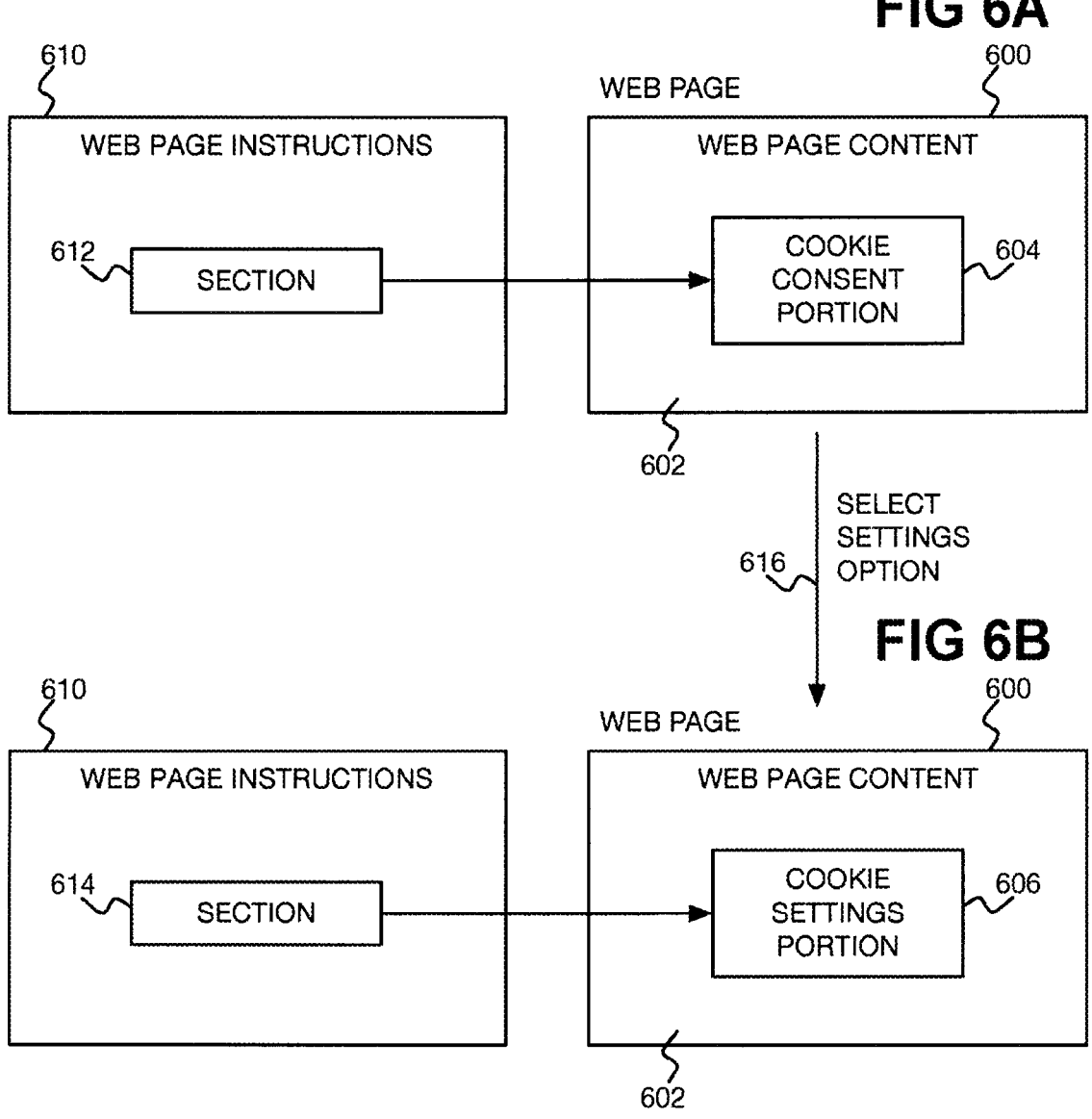
FIGS. 6A and 6B are diagrams of an example web page and example instructions for the web page, such that the cookie consent portion and the cookie settings portion of the web page correspond to respective sections of the instructions.

FIGS. 6A and 6B show an example web page 600 having corresponding web page instructions 610. Per FIG. 6A, when first loaded the web page 600 includes web page content 602 on which a cookie consent portion 604 is displayed. There is thus a section 612 within the web page instructions 610 that corresponds to the cookie consent portion 604. (Other sections of the instructions 610 are not shown for illustrative clarity and convenience.) The section 612 is part of the instructions 610 that are initially received from the web server hosting the web site including the web page 600 to first load the page 600. Upon selection of a settings option within the cookie consent portion 604, per arrow 616, a cookie settings portion 606 of the web page 600 is loaded and thus displayed on the web page content 602, per FIG. 6B.

There is thus a section 614 within the web page instructions 610 that is received from the web server in response to transmitting to the server a command corresponding to selection of the settings option within the cookie consent portion 604. The section 614 may therefore not be part of the instructions 610 that are initially received from the server when first loading the web page 600 in FIG. 6A. However, the section 614 may nevertheless be considered part of the instructions 610 for the web page 600 insofar as it corresponds to the cookie settings portion 606 that is considered part of the web page 600.

Figure 7A:
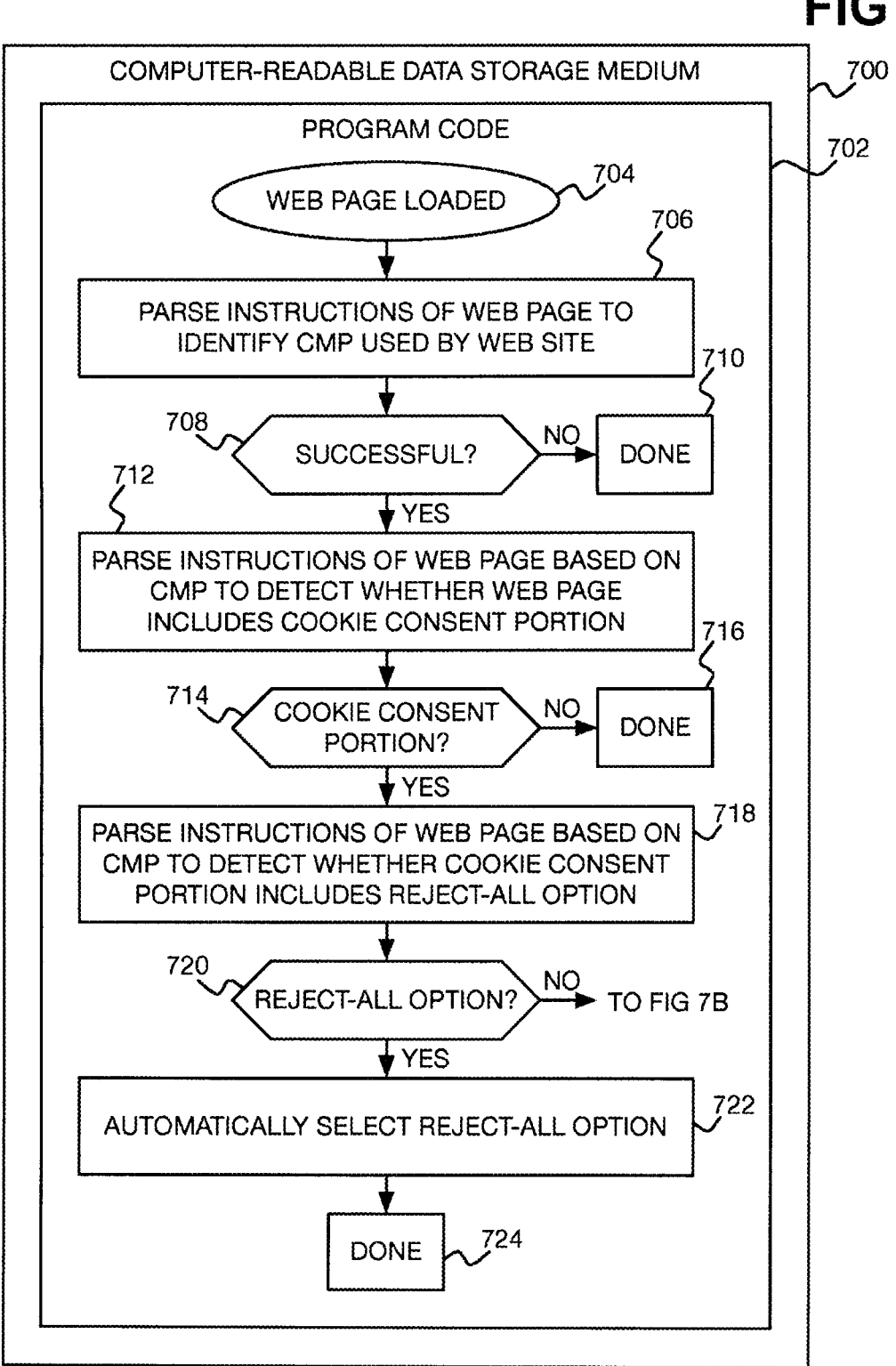
FIG. 7A is a diagram of an example non-transitory computer-readable data storage medium storing program code for performing example processing corresponding to the method of FIG. 2 in a particular implementation in which instructions of a web page are parsed.

FIG. 7A shows an example non-transitory computer-readable data storage medium 700 storing program code 702 executable by a processor to perform processing for automatically selecting the reject-all option when this option is displayed in the cookie consent portion of a loaded web page of a web site. The program code 702 may be that for a web browser or other application computer program running on a computing device include the processor. For instance, the program code 702 may be for a web browser plugin or extension installed in such a web browser. FIG. 7A is described in relation to the web page 600 of FIGS. 6A and 6B.

A web page 600 of a web site is loaded by the web browser or other application computer program (704). The processing includes, in response, parsing the instructions 610 for the web page 600 to identify the CMP used by the web site (706). When a given web site uses a given CMP, the instructions for web pages of the web site may include a platform identification pattern for that CMP. As one example, a web site that uses the CMP provided by OneTrust may include in the instructions for its web pages the platform identification pattern div id="onetrust-consent-sdk". Therefore, if the instructions 610 for the web page 600 include this pattern, it is determined that the web site including the page 600 uses the CMP provided by OneTrust.

As noted above, the CMPs used by the web sites that account for a large amount if not the majority of traffic across the Internet are relatively small in number. For each of at least a subset of these CMPs, the platform identification pattern can thus be determined and stored. To then identify which of these CMPs is used by the web site including the web page 600, the processing can determine, on a CMP-by-CMP basis, whether the platform identification patterns corresponding to the CMPs match (e.g., are included or present in) the instructions 610 of the page 600 until a matching pattern has been located. The CMP having this pattern is determined as the CMP used by the web site.

If none of the platform identification patterns corresponding to the CMPs match the instructions 610, then identifying the CMP used by the web site including the web page 600 is unsuccessful. In this case (708), the processing is finished (710). To the extent that loading of the web page 600 includes displaying the page 600, the user of the computing device has to manually select the desired cookie consent option if the web page 600 includes a cookie consent portion 604.

However, upon successfully identifying the CMP used by the web site (708), the processing includes then parsing the instructions 610 for the web cookie consent portion 604 (712). In addition to the platform identification pattern for each CMP, a cookie consent identification pattern is also determined and stored. The cookie consent identification pattern for a CMP is the pattern included in the instructions of a web page of a web site that uses the CMP. The section of the instructions including this pattern is the section that corresponds to the cookie consent portion of the web page.

For example, a web site that uses the CMP provided by OneTrust may include in the instructions for those of its web pages that display a cookie consent portion the cookie consent identification pattern div id="onetrust-group-container". Therefore, if a section of the instructions of such a web page includes this cookie consent identification pattern, then that the page includes a cookie consent portion is detected. As such, for the CMP that has been identified as being used by the web site including the web page 600, the instructions 610 for the web page 600 are parsed to determine whether any section thereof matches the cookie consent portion identification pattern corresponding to that CMP.

Upon failing to detect that the web page 600 includes a cookie consent portion 604 (714)—i.e., if the cookie consent portion identification pattern for the CMP does not match any section of the instructions 610 for the page 600—the processing is finished (716). In response to successfully detecting that the web page 600 includes a cookie consent portion 604 (714), however, in the example the processing includes further parsing the instructions 610 based on the identified CMP to detect whether the cookie consent portion 604 includes a reject-all option (718).

For instance, the processing may determine whether the section 612 of the instructions 610 corresponding to the cookie consent portion 604 includes a part (e.g., a line or a section of a line) that matches a reject-all option identification pattern for the CMP used by the web site. The reject-all option identification pattern for a given CMP is the pattern (in the section of web page instructions corresponding to the cookie consent portion) that corresponds to a reject-all option within the cookie consent portion.

For example, for a web page of a web site using the CMP provided by OneTrust that displays a cookie consent portion including a reject-all option, the reject-all option may be specified within the corresponding section of instructions for the web page via the reject-all option identification pattern class="ot . . . has-reject-all-button" or the reject-all option identification pattern onetrust-reject-all-handler. In the former pattern, the ellipses (" . . . ") are a wildcard placeholder indicating that there may be additional characters between ot and has-reject-all-button.

Therefore, if any part of the section 612 of the instructions 610 matches the reject-all-option identification pattern for the CMP used by the web site, then that the cookie consent portion 604 includes a reject-all option is detected. Upon failing to detect that the cookie consent portion 604 includes a reject-all option (720), however, the processing proceeds to FIG. 7B as described below. In response to successfully detecting that the cookie consent portion 604 includes a reject-all option (720), the processing includes, by comparison, then automatically selecting the reject-all option without user interaction (722), such that the processing is finished (724).

Figure 7B:
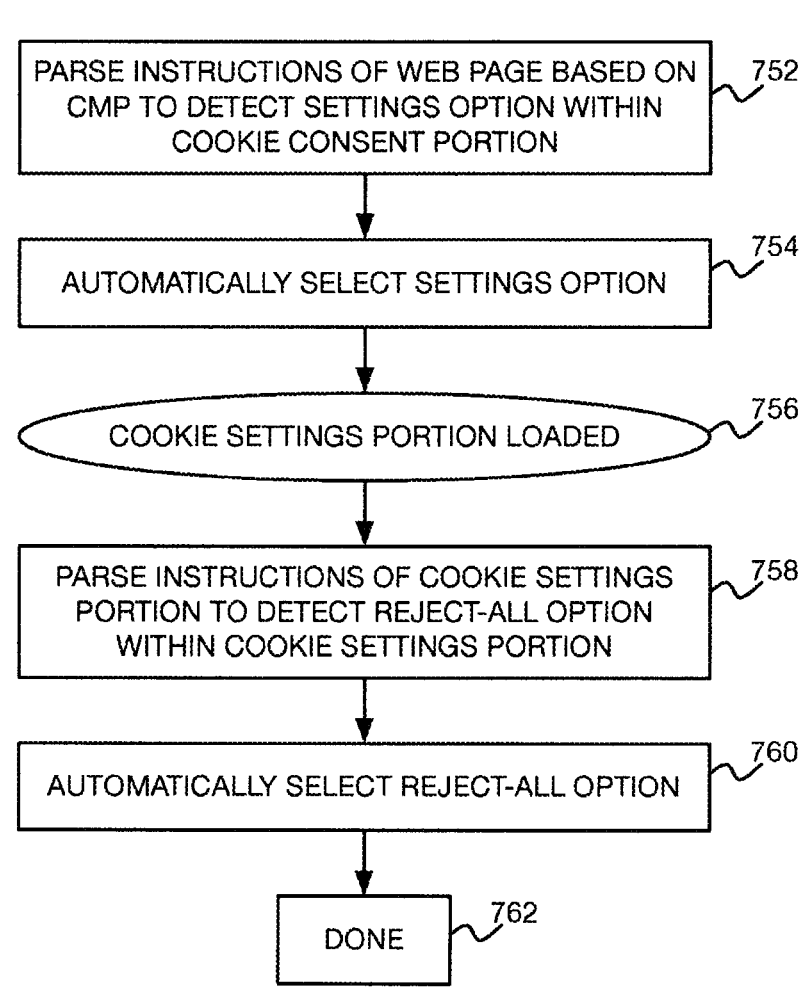
FIG. 7B is a diagram of example processing corresponding to the method of FIG. 4 in a particular implementation in which the instructions are parsed.

FIG. 7B shows example processing 750 for automatically selecting the reject-all option when this option is not displayed in the cookie consent portion of a loaded web page of a web site. The processing 750 may be implemented as part of the program code 702 stored on the medium 700 of FIG. 7A. The processing 750 is performed when the processing of FIG. 7A cannot detect a reject-all option in the cookie consent portion of the loaded web page. FIG. 7B is described in relation to the web page 600 of FIGS. 6A and 6B.

The processing 750 includes, in response to unsuccessfully detecting that the cookie consent portion 604 of the web page 600 includes a reject-all option, parsing the instructions 610 based on the identified CMP to identify (i.e., detect) a settings option within the cookie consent portion 604 (752). For instance, the processing may determine a part (e.g., a line or a section of a line) of the section 612 of the instructions 610 that matches a settings option identification pattern for the CMP used by the web site. The settings option identification pattern for a given CMP is the pattern (in the section of web page instructions corresponding to the cookie consent portion) that corresponds to the settings option within the cookie consent portion.

For example, for a web page of a web site using the CMP provided by OneTrust that displays a cookie consent portion, the settings option may be specified within the corresponding section of instructions for the web page via the settings option instruction pattern "onetrust-pc-btn-handler".

Therefore, the part of the section 612 of the instructions 610 that matches the settings option identification pattern corresponds to the settings option within the cookie consent portion 604. In response to identifying the settings option within the cookie consent portion 604 in this way, the processing 750 includes then automatically selecting the settings option without user interaction (754). Automatic selection of the settings option results in loading of a cookie settings portion 606 of the web page 600 (756).

The processing includes, in response to the cookie settings portion 606 having been loaded, parsing those of the instructions 610 that are for the cookie settings portion 606 (i.e., the additional section 614 of the instructions 610 that may have been received from the web server hosting the web site as a result of automatic selection of the settings option) to identify the reject-all option within the cookie settings portion 606 (758).

For instance, the processing may determine a part of the section 614 of the instructions 610 that matches a reject-all option identification pattern for the CMP used by the web site. The reject-all option identification pattern for a given CMP is the pattern (in the section of instructions corresponding to the cookie settings portion) that corresponds to a reject-all option within the cookie settings portion. For a given CMP, the reject-all option identification pattern used in the section corresponding to the cookie settings portion may be the same or different than the reject-all identification pattern used in the section corresponding to the cookie consent portion.

Therefore, the part of the section 614 of the instructions 610 that matches the reject-all identification pattern is the part corresponding to the reject-all option within the cookie settings portion 606. In response to detecting the reject-all option within the cookie settings portion 606, the processing 750 includes automatically selecting this reject-all option without user interaction (760). The processing 750 is therefore finished (762).

Figure 8:
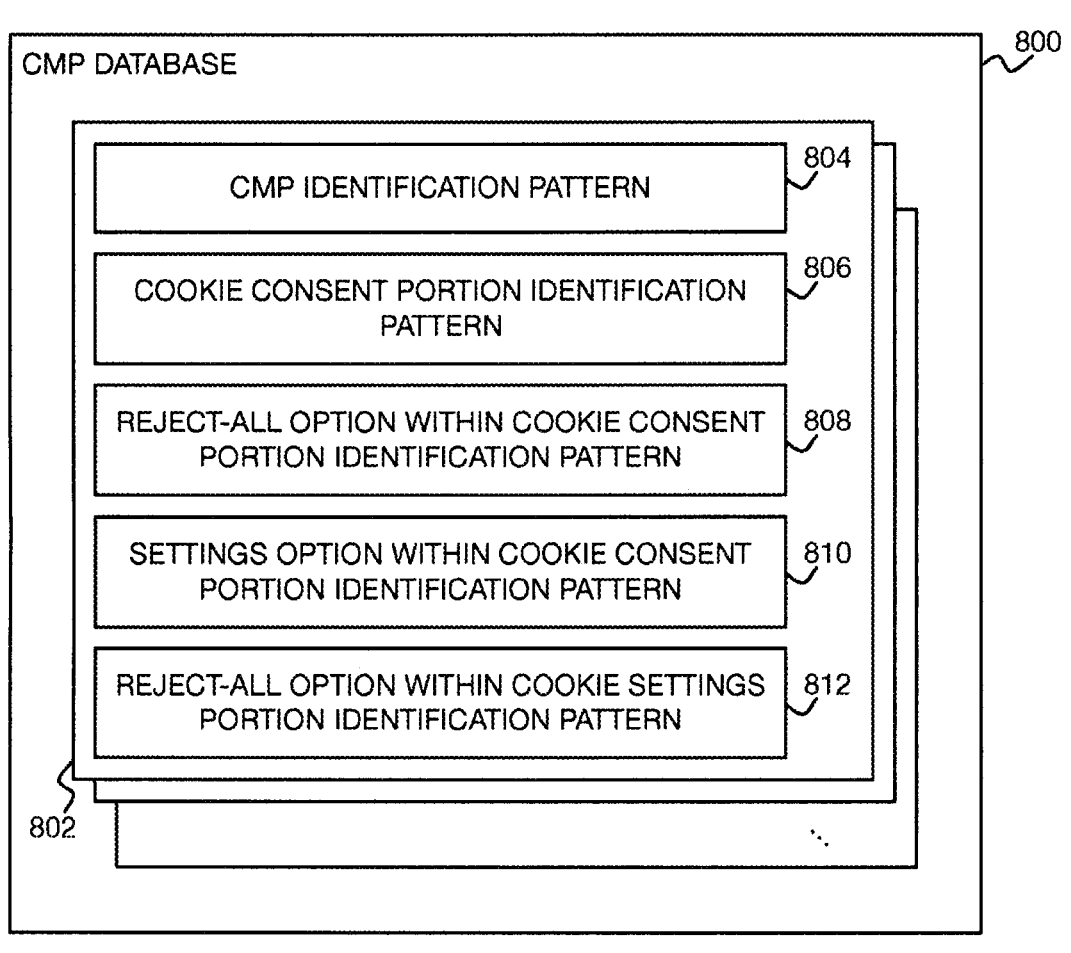
FIG. 8 is a diagram of an example content management platform (CMP) database that can be used in the processing of FIGS. 7A and 7B.

FIG. 8 shows an example CMP database 800 that may be used in the processing of FIGS. 7A and 7B. The CMP database 800 includes entries 802 for respective CMPs. The entry 802 for a CMP specifies the CMP identification pattern 804 that web pages of web sites that use the CMP for cookie consent management include in their instructions. The entry 802 for a CMP further specifies the cookie consent portion identification pattern 806 that each such web page which displays a cookie consent portion includes in the section of instructions corresponding to the cookie consent portion.

The entry 802 for a CMP can specify the reject-all option within cookie consent portion identification pattern 808 that each such web page which displays a cookie consent portion having a reject-all option includes in the section of instructions corresponding to the cookie consent portion. The identification pattern 808 in this case is specific to the identification pattern for the reject-all option in the cookie consent portion, as opposed to the identification pattern for the reject-all option in the cookie settings portion, for instance.

The entry 802 for a CMP can similarly specify the settings option within cookie consent portion identification pattern 810 that each web page of a web site using the CMP may include in the section of instructions corresponding to the cookie consent portion. The identification pattern 810 in this case is also specific to the identification pattern for the settings option in the cookie consent portion, as opposed to the identification pattern for the settings option that may be used in other portions.

The entry 802 for a CMP can also specify the reject-all option within cookie settings portion identification pattern 812 that each web page of a web site using the CMP may include in the section of instructions corresponding to the cookie settings portion. The identification pattern 812 in this case is specific to the identification pattern for the reject-all option in the cookie settings portion, as opposed to the identification pattern for the reject-all in the cookie consent portion, for instance.

Example patterns 804, 806, 808, 810, and 812 for the CMP provided by One Trust have been described in relation to FIGS. 7A and 7B. Different patterns 804, 806, 808, 810, and 812 will likely be used for other CMPs. For example, for the Cookiebot CMP, the CMP identification pattern 804 may be "Cmp": "Cookiebot by Usercentrics". The cookie consent portion identification pattern 806 for the Cookiebot CMP may be "#CybotCookiebotDialog". The reject-all identification patterns 808 and 812 for the CookieBot CMP may be "RejectId". The settings option identification pattern 810 for the CookieBot CMP may be "CookieSettings".

Furthermore, for a given CMP, the patterns 804, 806, 808, 810, and 812 may be more complex or sophisticated than the examples that have been provided. For example, the reject-all option within cookie settings portion identification pattern 812 may include multiple patterns corresponding to different cookie types and indicate how a control corresponding to each pattern is to be selected. That is, the pattern 812 may include a pattern for each cookie type, such as performance cookies, targeting cookies, functionality cookies, and unclassified cookies, and indicate that a toggle control for each is to be selected such that consent is not provided.

The patterns 804, 806, 808, 810, and 812 for a given CMP can be specified as regular expression patterns to be searched for matching instances in the instructions of a web page (or a section thereof). The patterns 804, 806, 808, 810, and 812 for a given CMP can be specified in other ways as well. For example, a pattern may be specified as a hierarchical tree of search patterns that is traversed in accordance with matching instances in the web page instructions (or a section thereof) to determine whether the pattern in question is present in the instructions (or a section thereof). As another example, a pattern may be specified as a set of rules that are applied, or code (e.g., a script) that is executed, to determine whether the pattern in question is present in the web page instructions or a section thereof.

Furthermore, in the detailed description of the drawings above, cookie consent has been described as being provided to a web site without user interaction via automatic selection of a reject-all option in the cookie consent portion or the cookie settings of a web page of the web site. That is, the cookie consent that has been described above with reference to the drawings is for strictly necessary cookies. However, these techniques can be extended to providing cookie consent for all cookies, or for any level of granularity between consenting to only strictly necessary cookies and consenting to all cookies.

Figure 9A:
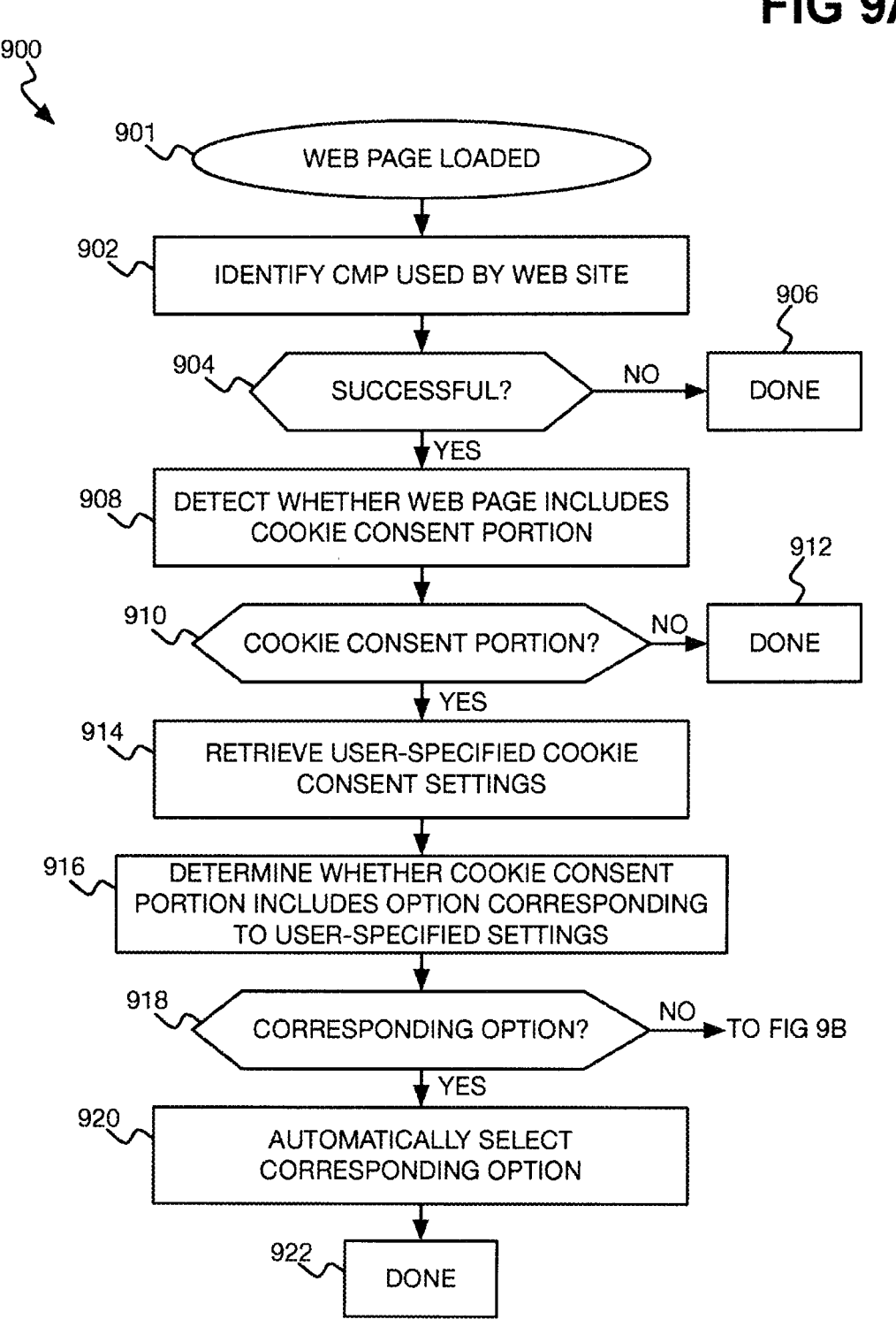
FIGS. 9A and 9B are flowcharts of example methods respectively corresponding to the methods of FIGS. 2 and 4 but in a more generalized implementation in which an option corresponding to user-specified cookie consent settings is selected within the cookie consent portion or the cookie settings portion of a web page.
Figure 9B:
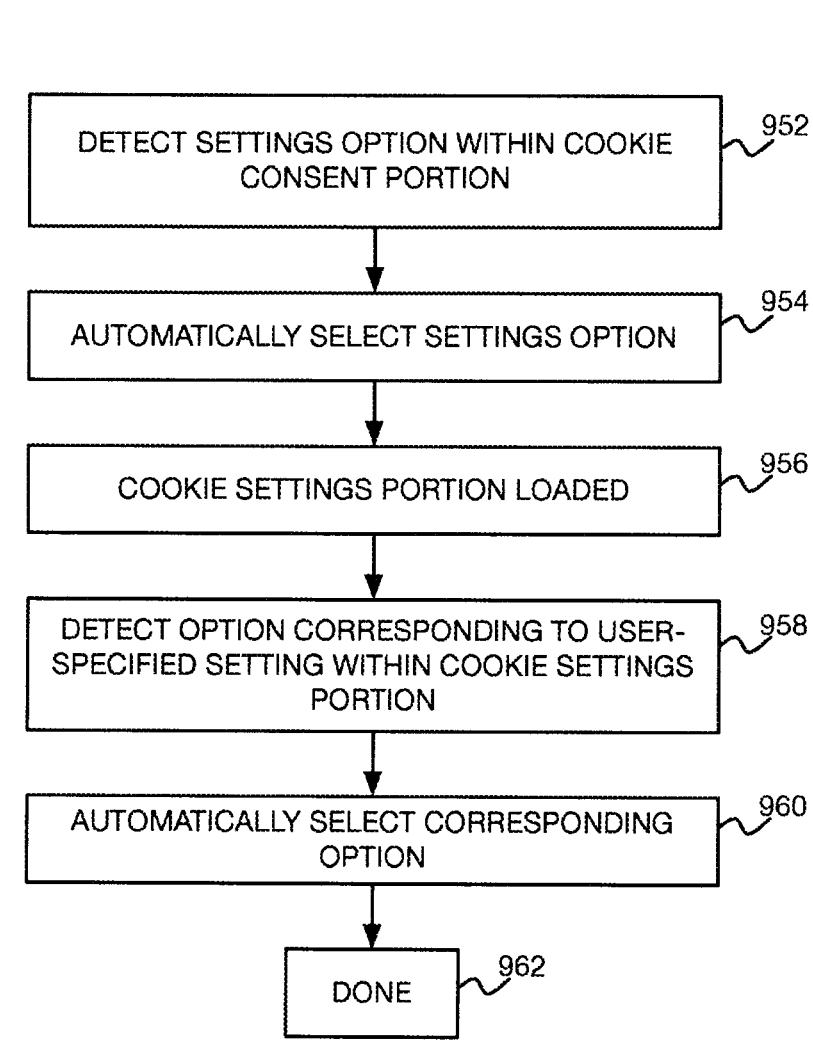

FIGS. 9A and 9B respectively show methods 900 and 950 in such a more generalized implementation, in which an option corresponding to user-specified cookie consent settings is selected within the cookie consent portion or the cookie settings portion of a web page. Like the method 200 of FIG. 2, the methods 900 and 950 may be performed by a processor of a computing device executing program code. The methods 900 and 950 may be performed by a web browser or other application program running on a computing device, and may be implemented as a web browser plugin or extension installed in such a browser.

Referring first to FIG. 9A, a web page of a web site is loaded by the web browser or other application computer program (901). The method 900 includes, upon the web page being loaded, identifying the CMP used by the web site (902). If the CMP used by the web site is not successfully identified (904), then the method 900 is finished (906). Upon successfully identifying the CMP used by the web site (904), however, the method 900 includes further detecting whether the web page includes a cookie consent portion (908). If a cookie consent portion is not detected (910), then the method 900 is also finished (912).

In response to successfully detecting that the web page includes a cookie consent portion (910), however, the method 900 includes retrieving user-specified cookie consent settings (914). The method 900 includes then detecting whether the cookie consent portion includes an option corresponding to the user-specified settings, based on the CMP used by the web site (916). The method 900 may determine whether there is an option corresponding to the user-specified settings by parsing the section of web page instructions corresponding to the cookie consent portion for a respective pattern.

For example, if the user-specified cookie consent settings permit usage of only strictly necessary cookies, then whether the cookie consent portion includes a reject-all option is determined, such as by identifying whether any part of the section of instructions corresponding to the cookie consent portion matches a reject-all identification pattern. As another example, if the user-specified cookie consent settings permit usage of all cookies, then whether the cookie consent portion includes an accept-all option is determined, such as by similarly identifying whether any part of the section of instructions corresponding to the cookie consent portion matches an accept-all identification pattern.

As a third example, if the user-specified cookie consent settings permit usage of more than only the strictly necessary cookies but less than all cookies, then whether the cookie consent portion includes a corresponding option is determined. Similarly in this case, whether the section of instructions corresponding to the cookie consent portion includes a pattern corresponding to an option for the user-specified cookie consent settings is determined. For instance, as has been described above, the pattern may include multiple patterns and specify how a toggle control for each pattern is to be selected.

Upon failing to detect that the cookie consent portion of the web page includes a corresponding option for the user-specified cookie consent settings (918), the method 900 proceeds to FIG. 9B. However, in response to detecting that the cookie consent portion includes the corresponding option (918), the method 900 automatically selects the option without user interaction (920) to consent to the web site using cookies in accordance with the user-specified cookie consent setting, which causes the site to only use cookies per this setting. That is, the site can subsequently store cookies on the computing device that is performing the method 900 only if they are permitted by the user-specified cookie consent setting. The method 900 is then finished (922).

Referring next to FIG. 9B, the method 950 includes, in response to unsuccessfully detecting that the cookie consent portion includes an option corresponding to the user-specified cookie consent settings, detecting a settings option within the cookie consent portion based on the CMP used by the web site (952). The method 950 includes then automatically selecting the settings option without user interaction (954). Automatic selection of the settings option within the cookie consent portions results in loading of a cookie settings portion of the web page (956).

The method 950 includes, in response to the cookie settings portion having been loaded, detecting an option corresponding to the user-specified cookie settings within the cookie settings portion, based on the CMP used by the web site (958). The option may be detected by parsing the section of the web page instructions corresponding to the cookie settings portion to determine a part of the section that matches a pattern corresponding to the option. The method 950 includes automatically selecting this detected option without user interaction (960) such that the web site subsequently uses cookies in accordance with the user-specified cookie consent settings. The method 950 is then finished (962).

Figure 10:
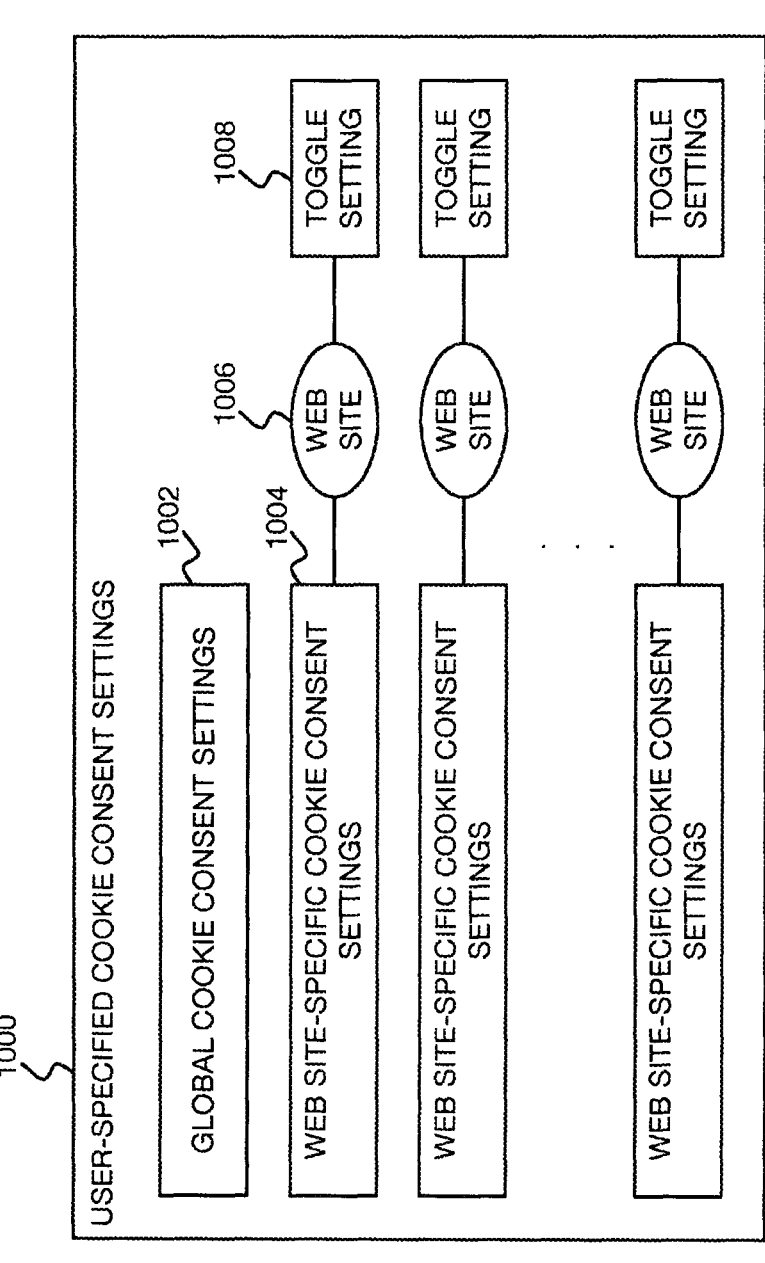
FIG. 10 is a diagram of example user-specified cookie consent settings that can be used in the methods of FIGS. 9A and 9B.

FIG. 10 shows example user-specified cookie consent settings 1000 that may be used in the methods 900 and 950 of FIGS. 9A and 9B. The user-specified cookie consent settings 1000 may include global cookie consent settings 1002 that are used by default, and which do not pertain to only a specific web site. However, a user may also be permitted to store web site-specific cookie consent settings 1004 for each of a number of web sites 1006. A set of web site-specific cookie consent settings 1004 thus pertains only to its corresponding web site 1006.

Once the user has established web site-specific cookie consent settings 1004 for a given web site 1006, there may be a user-selectable toggle setting 1008 for the web site 1006 that the user can toggle to specify whether the global cookie consent settings 1002 or the web site-specific cookie consent settings 1004 should be used. The toggle setting 1008 permits the user to revert to the global cookie consent settings 1002 for a web site 1006 even after having specified web-site specific cookie consent settings 1004 for the site 1006, without deleting the web-site specific cookie consent settings 1004. The user can thus subsequently switch between the global cookie consent settings 1002 and the web site-specific cookie consent settings 1004 for a web site 1006 as desired.

Figure 11:
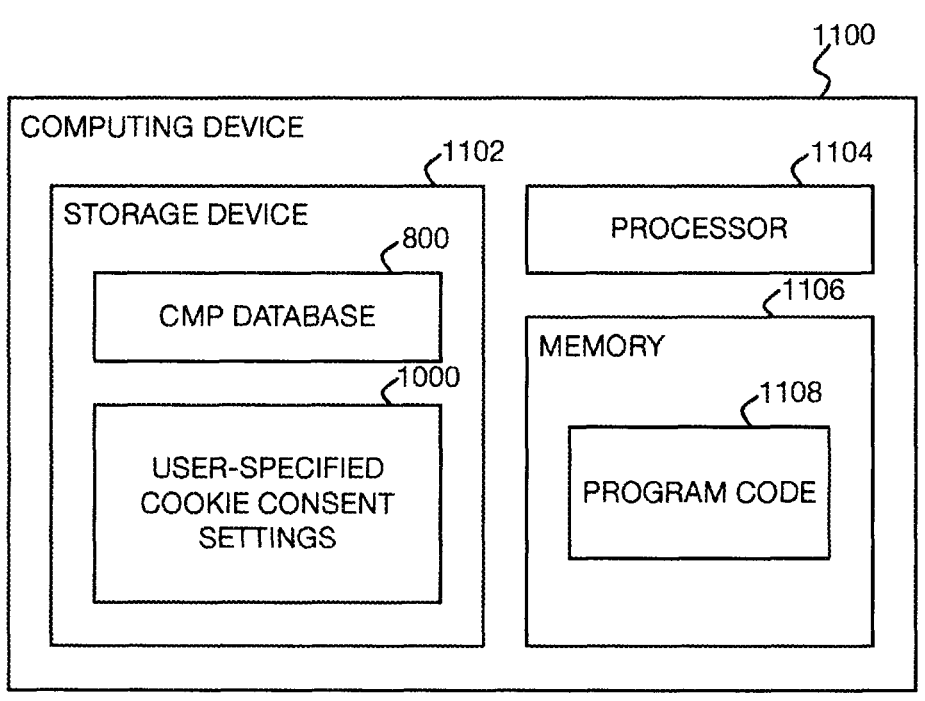
FIG. 11 is a diagram of an example computing device.

FIG. 11 shows an example computing device 1100. The computing device 1100 may be for an end user, and may be a desktop, laptop, or notebook computer, a tablet computing device, a smartphone, or another type of computing device. The computing device 1100 can include a storage device 1102, and includes at least a processor 1104 and memory 1106. The computing device 1100 can include other components in addition to those shown in the example. The storage device 1102 can store the CMP database 800 and/or the user-specified cookie content settings 1000 that have been described. The memory 1106 stores program code 1108 that is executable by the processor 1104 to perform the methods and the processing described above.

Techniques have been described herein for automatically providing cookie consent to web sites without user interaction. The techniques can detect whether a loaded web page of a web site includes a cookie consent portion, and further can detect different options within the cookie consent portion as well as a cookie settings portion of the web page. Each such detection can be based on the CMP used by the web site to manage cookie consent. Therefore, the techniques described herein do not have to know how every individual web site presents cookie consent options on its web pages, but rather just how individual CMPs prescribe such presentation do. Being able to detect how even a small number of CMPs specify presentation of cookie consent options nevertheless permits the techniques described herein to automatically provide cookie consent for a comparatively large number of web sites.

We claim:

1. A non-transitory computer-readable data storage medium storing program code executable by a computing device to perform processing comprising:
   in response to a web browser running on the computing device having loaded a web page of a web site, parsing instructions of the web page to identify a consent management platform (CMP) used by the web site, by determining, on a CMP-by-CMP basis, whether platform identification patterns corresponding to a plurality of CMPs match the instructions of the web page until the CMP used by the web site has been identified;
   upon identifying the CMP used by the web site, parsing the instructions of the web page based on the CMP to detect that the web page includes a cookie consent portion;
   in response to detecting that the web page includes the cookie consent portion, parsing the instructions of the web page based on the CMP to detect whether the cookie consent portion includes a reject-all option; and
   in response to detecting that the cookie consent portion includes the reject-all option, automatically selecting the reject-all option without user interaction.

2. The non-transitory computer-readable data storage medium of claim 1, wherein the stored program code comprises a browser plugin or extension installed in the web browser.

3. The non-transitory computer-readable data storage medium of claim 1, wherein parsing the instructions of the web page to detect that the web page includes the cookie consent portion comprises:
   determining a section of the instructions of the web page that matches a cookie consent portion identification pattern corresponding to the CMP used by the web site.

4. The non-transitory computer-readable data storage medium of claim 3, wherein parsing the instructions of the web page to detect whether the cookie consent portion includes the reject-all option comprises:
   determining whether any part of the section of the instructions matching the cookie consent portion identification pattern matches a reject-all option identification pattern corresponding to the CMP used by the web site.

5. The non-transitory computer-readable data storage medium of claim 1, wherein the processing further comprises, in response to detecting that the cookie consent portion does not include the reject-all option:
   parsing the instructions of the web page based on the CMP used by the web site to detect a settings option within the cookie consent portion;

automatically selecting the settings option without user interaction;

in response to a cookie settings portion having been loaded as a result of selection of the settings option, parsing instructions of the cookie settings portion based on the CMP used by the web site to detect the reject-all option within the cookie settings portion; and automatically selecting the reject-all option within the cookie settings portion without user interaction.

6. The non-transitory computer-readable data storage medium of claim 5, wherein parsing the instructions of the web page to detect that the web page includes the cookie consent portion comprises:

determining a section of the instructions of the web page matching a cookie consent portion identification pattern corresponding to the CMP used by the web site.

7. The non-transitory computer-readable data storage medium of claim 6, wherein parsing the instructions of the web page to detect the settings option within the cookie consent portion comprises:

determining a part of the section of the instructions matching the cookie consent portion identification pattern that matches a settings option identification pattern corresponding to the CMP used by the web site.

8. The non-transitory computer-readable data storage medium of claim 7, wherein parsing the instructions of the cookie settings portion to detect the reject-all option within the cookie settings portion comprises:

determining a part of the instructions of the cookie settings portion that matches a reject-all identification pattern corresponding to the CMP used by the web site.

9. A computing device comprising:

a processor; and a memory storing program code for a plugin or extension installed within a web browser of the computing device, the stored program code executable by the processor to:

in response to the web browser having loaded a web page of a web site, identify a consent management platform (CMP) used by the web site;

detect that the web page includes a cookie consent portion based on the CMP used by the web site;

in response to detecting that the web page includes the cookie consent portion, retrieve user-specified cookie consent settings;

in response to the user-specified cookie consent settings permitting usage of only strictly necessary cookies:

determine whether the cookie consent portion includes a reject-all option, based on the CMP used by the web site; and in response to detecting that the cookie consent portion includes the reject-all option, automatically select the reject-all option without user interaction;

in response to the user-specified cookie consent settings permitting usage of more than only the strictly necessary cookies but not all cookies, and the program code is executable by the processor to further:

detect a settings option within the cookie consent portion; and in response to a cookie settings portion having been loaded as a result of selection of the settings option, detect and automatically select an option within the cookie settings portion corresponding to the user-specified cookie consent settings.

10. The computing device of claim 9, wherein the program code is executable by the processor to further, in response to the user-specified cookie consent settings permitting usage of only the strictly necessary cookies:

in response to detecting that the cookie consent portion does not include the reject-all option:

detect and automatically select a settings option within the cookie consent portion, based on the CMP used by the web site;

automatically select the settings option without user interaction; and in response to a cookie settings portion having been loaded as a result of selection of the settings option, detect and automatically select the reject-all option within the cookie settings portion.

11. The computing device of claim 9, wherein the program code is executable by the processor to further, in response to the user-specified cookie consent settings permitting usage of all the cookies:

detect an accept-all option within the cookies consent portion, based on the CMP used by the web site; and automatically select the accept-all option without user interaction.

12. The computing device of claim 9, wherein the program code is executable by the processor to identify the CMP used by the web site by determining, on a CMP-by-CMP basis, whether platform identification patterns corresponding to a plurality of CMPs match instructions of the web page until the CMP used by the web site has been identified, wherein the program code is executable by the processor to detect that the web page includes the cookie consent portion by determining a section of the instructions of the web page that matches a cookie consent portion identification pattern corresponding to the CMP used by the web site, and wherein the program code is executable by the processor to detect whether the cookie consent portion includes the reject-all option by determining whether any part of the section of the instructions matching the cookie consent portion identification pattern matches a reject-all option identification pattern corresponding to the CMP used by the web site.

13. The computing device of claim 12, further comprising:

a storage device to store a database for the plugin or extension, the database including a plurality of entries corresponding to the plurality of CMPs, the plurality of entries respectively including the platform identification patterns corresponding to the plurality of CMPs, each entry including the cookie consent portion identification pattern and the reject-all option identification pattern for a corresponding CMP.

14. The computing device of claim 12, wherein the user-specified cookie consent settings comprise:

global cookie consent settings that are not for only the web site including the web page; and web site-specific cookie consent settings that are for only the web site; and a user-selectable setting as to whether to use the user-specified global cookie consent settings or the web site-specific cookie consent settings for the web site.

15. A method comprising:

in response to a web browser of a computing device having loaded a web page of a web site, identifying, by a plugin or extension installed within the web browser and executed by a processor, identifying a consent management platform (CMP) used by the web site;

detecting, by the plugin or the extension, that the web page includes a cookie consent portion based on the CMP used by the web site by determining a section of instructions of the web page that matches a cookie consent portion identification pattern corresponding to the CMP used by the web site;

in response to detecting that the web page includes the cookie consent portion, retrieving, by the plugin or the extension, user-specified cookie consent settings;

in response to the user-specified cookie consent settings permitting usage of only strictly necessary cookies:

determining, by the plugin or the extension, whether the cookie consent portion includes a reject-all option, based on the CMP used by the web site, by determining whether any part of the section of the instructions matching the cookie consent portion identification pattern matches a reject-all option identification pattern corresponding to the CMP used by the web site; and in response to detecting that the cookie consent portion includes the reject-all option, automatically selecting, by the plugin or the extension, the reject-all option without user interaction.

16. The method of claim 15, further comprising, in response to the user-specified cookie consent settings permitting usage of only the strictly necessary cookies:

in response to detecting that the cookie consent portion does not include the reject-all option:

detecting and automatically selecting, by the plugin or the extension, by a settings option within the cookie consent portion, based on the CMP used by the web site;

automatically selecting, by the plugin or the extension, the settings option without user interaction; and in response to a cookie settings portion having been loaded as a result of selection of the settings option, detecting and automatically selecting, by the plugin or the extension, the reject-all option within the cookie settings portion.

17. The method of claim 15, further comprising, in response to the user-specified cookie consent settings permitting usage of all cookies:

detecting, by the plugin or the extension, an accept-all option within the cookies consent portion, based on the CMP used by the web site; and automatically selecting, by the plugin or the extension, the accept-all option without user interaction.

18. The method of claim 15, wherein the user-specified cookie consent settings permitting usage of more than only the strictly necessary cookies but not all cookies, and the method further comprises:

detecting, by the plugin or the extension, a settings option within the cookie consent portion; and in response to a cookie settings portion having been loaded as a result of selection of the settings option, detecting and automatically selecting, by the plugin or the extension, an option within the cookie settings portion corresponding to the user-specified cookie consent settings.

19. The method of claim 15, wherein identifying the CMP used by the web site comprises:

determining, on a CMP-by-CMP basis, whether platform identification patterns corresponding to a plurality of CMPs match the instructions of the web page until the CMP used by the web site has been identified.

20. The method of claim 15, wherein the user-specified cookie consent settings comprise:

global cookie consent settings that are not for only the web site including the web page; and web site-specific cookie consent settings that are for only the web site; and a user-selectable setting as to whether to use the user-specified global cookie consent settings or the web site-specific cookie consent settings for the web site.

\* \* \* \* \*